United States Patent [19]

Shinohara

[11] Patent Number: 5,724,285
[45] Date of Patent: Mar. 3, 1998

[54] FLASH MEMORY PC CARD CAPABLE OF REFRESHING DATA A PREDETERMINED TIME AFTER THE PC CARD IS REMOVED FROM A HOST

[75] Inventor: Takayuki Shinohara, Tokyo, Japan

[73] Assignee: Mitsubishi Denki Kabushiki Kaisha, Tokyo, Japan

[21] Appl. No.: 713,646

[22] Filed: Sep. 13, 1996

[30] Foreign Application Priority Data

Mar. 8, 1996 [JP] Japan ..................... 8-051524

[51] Int. Cl.⁶ ............................. G11C 16/06
[52] U.S. Cl. ............... 365/185.25; 365/185.33; 365/236; 365/228; 395/182.04; 395/430; 235/492
[58] Field of Search ............... 365/185.25, 185.33, 365/63, 72, 236, 222, 228; 395/182.04, 430; 235/492

[56] References Cited

U.S. PATENT DOCUMENTS 5,511,020  4/1996  Hu et al. .................... 365/185.28
5,515,333  5/1996  Fujita et al. ................ 365/229
5,619,452  4/1997  Miyauchi .................... 365/185.29
5,627,783  5/1997  Miyauchi .................... 365/185.33

FOREIGN PATENT DOCUMENTS 62-128097  6/1987  Japan.
1-017300   1/1989  Japan.

*Primary Examiner*—David C. Nelms
*Assistant Examiner*—Andrew Q. Tran

[57] ABSTRACT

In order to hold data correctly for a longer time in a flash PC card comprising a flash memory device, a timer starts counting a predetermined time when the PC card is removed from a host. When the PC card is inserted into the host again, a controller refreshes data stored in the flash memory device if the timer has counted the predetermined time. In a different PC card, a flash PC card comprises an internal power supply. A timer starts counting a predetermined time after an external power supply is stopped. When the timer has counted a predetermined time, the power supply starts to supply an electric power. A controller refreshes data stored in the flash memory device when the internal power supply starts to supply an electric power.

6 Claims, 6 Drawing Sheets

FLASH MEMORY PC CARD CAPABLE OF REFRESHING DATA A PREDETERMINED TIME AFTER THE PC CARD IS REMOVED FROM A HOST

BACKGROUND OF THE INVENTION

1. Field of the Invention

The present invention relates to a flash PC card using a flash memory as an external memory device of an information processor such as a computer.

2. Description of the Prior Art

A flash memory is a nonvolatile memory wherein data can be erased and written. A flash PC card including a flash memory is used as an external memory device of an information processor such as a computer. A flash PC card has a control circuit for reading or writing data to and from the flash memory according to a request of data read or data write from an information processor connected to the card.

A memory cell in a flash memory comprises a memory transistor of double gate structure consisting of a control gate and a floating gate. A flash memory stores a data according to a change in threshold value of the transistor by injecting or extracting electrons to and from a floating gate insulated electrically.

In the PC card, data are written to and erased in the flash memory repeatedly, or injection and extraction of electrons to and from a floating gate are repeated. Then, an insulating oxide film between the floating gate and the substrate is deteriorated gradually. Thus, it is a problem that electrons injected in the floating gate are leaked and that data holding characteristic is deteriorated.

SUMMARY OF THE INVENTION

An object of the present invention is to provide an ATA-PC card which can hold data correctly for a longer time.

In one aspect of the invention, a flash ATA-PC card including a flash memory device comprises a timer which starts counting a predetermined time when the card is removed from a host. The data stored in the flash memory are refreshed if the timer has counted the predetermined time before the electric power is supplied again from the host.

In a second aspect of the invention, a flash PC card including a flash memory device comprises a timer and an internal power supply. The timer starts counting a predetermined time when an external power supply is stopped. When the timer has counted a predetermined time, the internal power supply supplies an electric power to refresh data stored in the flash memory device.

Preferably, the PC card comprises an error correcting code circuit. The controller reads data in the flash memory device through the error correcting code circuit and writes corrected data on which the error correcting code circuit detects correctable read errors when data stored in the flash memory device are refreshed.

Preferably, a power control device is provided further for decreasing an electric voltage applied to control gates of transistors included in the flash memory device. The controller makes the power control device decrease the electric voltage when an uncorrectable data is detected in the data read from the flash memory device and writes corrected data if the error correcting code circuit detects correctable read errors when the data on which the uncorrectable data is detected are read.

An advantage of the present invention is that data in a card can be prevented efficiently from vanishing due to deterioration of data holding characteristic when the card is not used for a long time.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
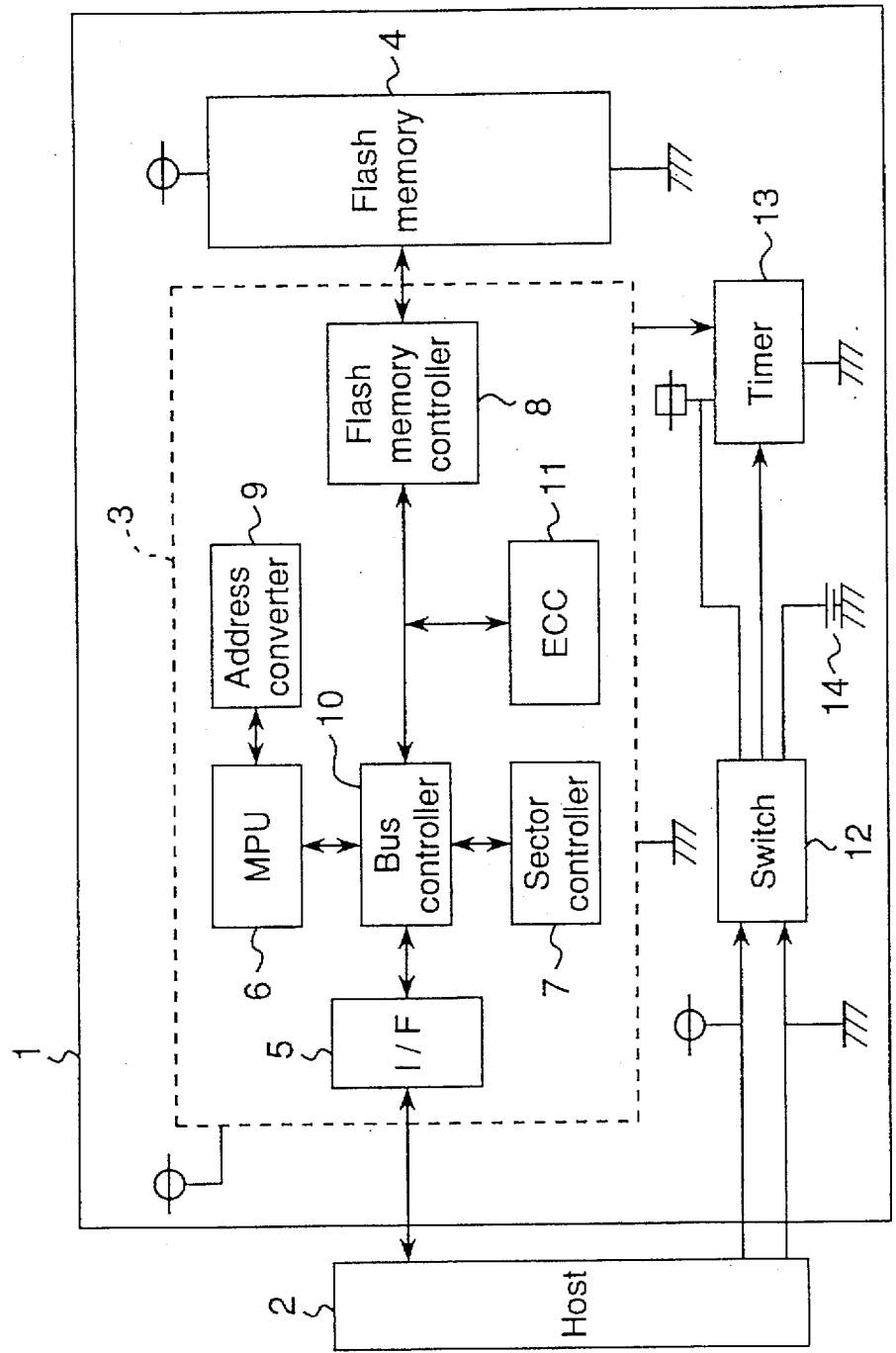
FIG. 1 is a block diagram of a flash ATA-PC card of a first embodiment of the invention.

Referring now to the drawings, wherein like reference characters designate like or corresponding parts throughout the several views, FIG. 1 shows a flash ATA-PC card of a first embodiment of the invention. The card 1 including a flash memory 4 is connected to a host 2 which supplies an electric power to the card 1. The connection of the card 1 to the host 2 is based on the ATA standards for a PC card. The card 1 has a feature that when the card 1 is inserted again, if a time longer than a predetermined time has elapsed after the card 1 is removed from the host 2, data stored in a flash memory 4 are refreshed.

As shown in FIG. 1, the card 1 comprises the flash memory 4 and a flash disk controller 3 controlling the flash memory 4. The controller 3 comprises an interface 5, a microprocessor (MPU) 6, a sector buffer 7, a flash memory controller 8, and an error correcting code (ECC) circuit 11, all connected to a bus controller 10. The interface 5 is connected to the host 2 for communicating data and commands. An address conversion circuit 9 for converting a logical address to a physical address is connected to the microprocessor 6. The flash memory controller 8 is connected to the flash memory 4 for controlling data write and data read to and from the flash memory 4. When the host requests data read of data in a logical sector through the interface 5, the microprocessor 6 reads data in a physical sector in correspondence to the logical sector determined by the address conversion circuit 9.

The card 1 further comprises a power supply switch circuit 12, a timer 13 and a cell 14. The switch circuit 12 selects an electric power for the timer 13 between an external power supplied from the host 2 and an internal power supplied from the cell 14 inside the card. When the card 1 is extracted or isolated electrically from the host 2, and power supply from the host 2 is stopped, the timer 13 starts counting. When the card 1 is connected again to the host 2 and an electric power is supplied again from the host 2, the timer 13 may have counted a predetermined time. The predetermined time is set at a time such as a half year or a year appropriate for checking deterioration of data holding state which depends on fabrication precisian of the flash memory 4. If it is decided that the timer 13 has already counted the predetermined time or the card 1 is not used for the predetermined time, the data stored in the flash memory 4 are refreshed.

Refreshing is performed as follows: Data in each sector in the flash memory 4 are read through the ECC circuit 11 to check if the data are inverted due to leak of injection electrons at the floating gate or not. Corrected data are written to a sector on which a read error correctable is detected.

Next, operation of the card 1 is explained below in detail. When the card 1 is extracted from the host 2 and a power supply from the host 2 is stopped, the switch circuit 12 selects a power supply from the cell 14 for the timer 13. Then, the timer 13 starts counting. When the card 1 is connected again to the host 2 and power supply from the host 2 to the card is resumed, the switch circuit 13 stops power supply from the cell 14. Then, before initializing the components in the card 1 in correspondence to resuming of the power supply from the host 2, the microprocessor 6 refreshes data stored in the flash memory 4 as will be explained below.

Figure 2:
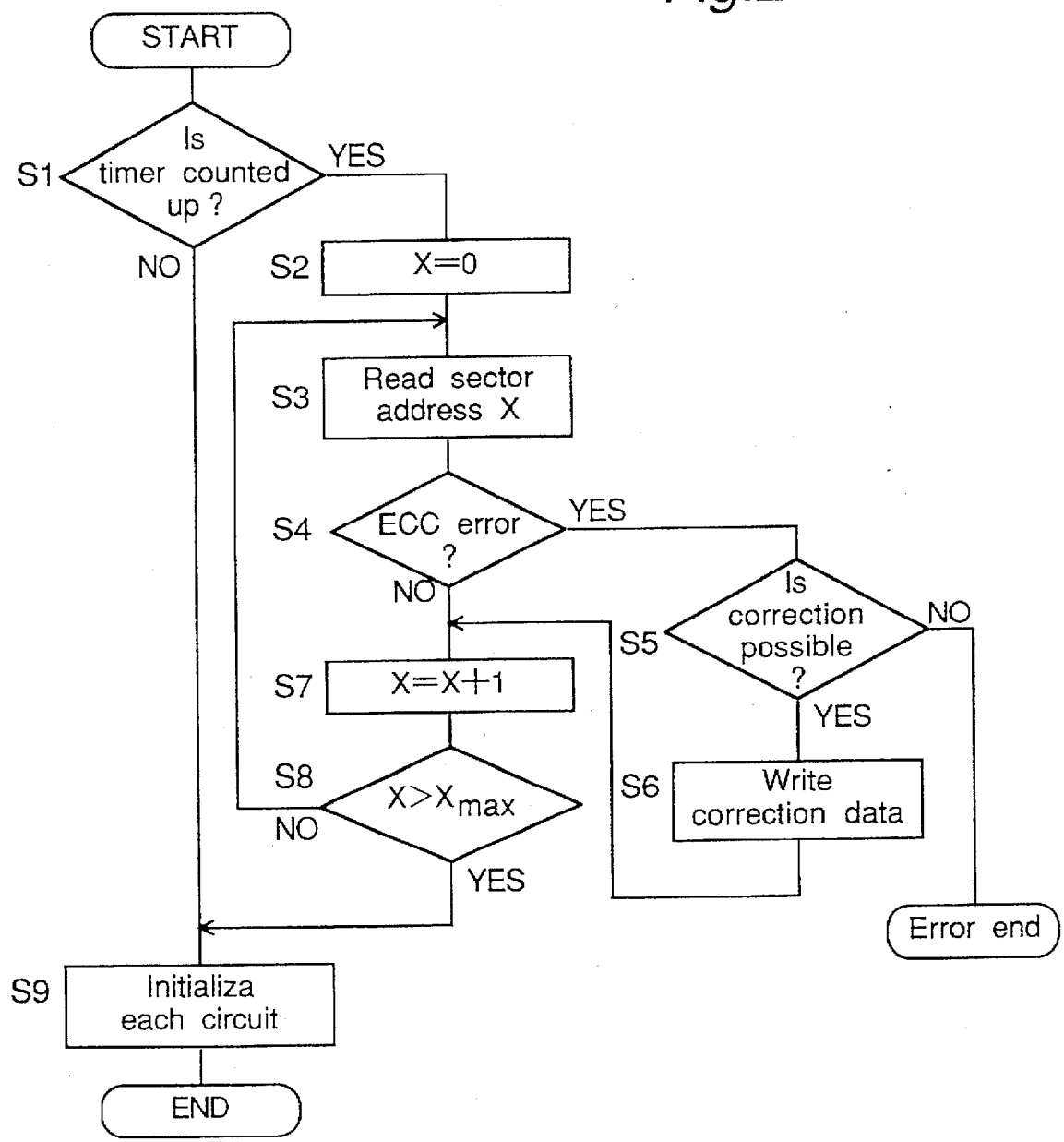
FIG. 2 is a flowchart of a microprocessor of the flash ATA-PC card of the first embodiment of the invention.

FIG. 2 shows a flowchart of the microprocessor when the power supply is resumed. If it is decided that a predetermined time has been counted by the timer 13 (YES at step S1), the card 1 is not used for a long time of the predetermined time. Then, in order to refresh data stored in the flash memory 4, a variable X is first set at zero (step S2), and a data at the sector address X is read (step S3). If a read error is detected by the ECC circuit 11 (YES at step S4) and the read error is decided to be correctable (YES at step S5), a corrected data is written to the sector of address X (step S6). On the other hand, if the read error is decided not to be correctable (NO at step S5), the flow ends. If no data read error is detected (NO at step S4), or if the read error is corrected even if it is detected (step S6), the variable X is incremented by one to check a next sector (step S7). If the variable X is less than the maximum sector number $X_{max}$ of the flash memory 4 (NO at step S8), the flow returns to step S3. If the variable X exceeds the maximum sector number $X_{max}$ (YES at step S8), all the sectors in the flash memory 4 have been checked. Then, the components in the card 1 are initialized (step S9), and this initialization including reset of the timer 13.

Refresh of the data in each sector stored in the flash memory 4 (steps S2–S8) needs a some time. Then, if power supply to the card 1 is resumed from the host 2 before the predetermined time is counted by the timer 13 (NO at step S1), or if the card 1 is used frequently, the components in the card 1 are initialized without performing refresh of the data stored in the flash memory 4 (step S9). In other words, refresh is performed only when the card 1 is not used for a predetermined time. Therefore, refreshing is not performed on a card used frequently, and a card is used without unnecessary inconvenience. On the other hand, data can be prevented efficiently from vanishing due to deterioration of data holding characteristic when the card is not used for a long time.

Figure 3:
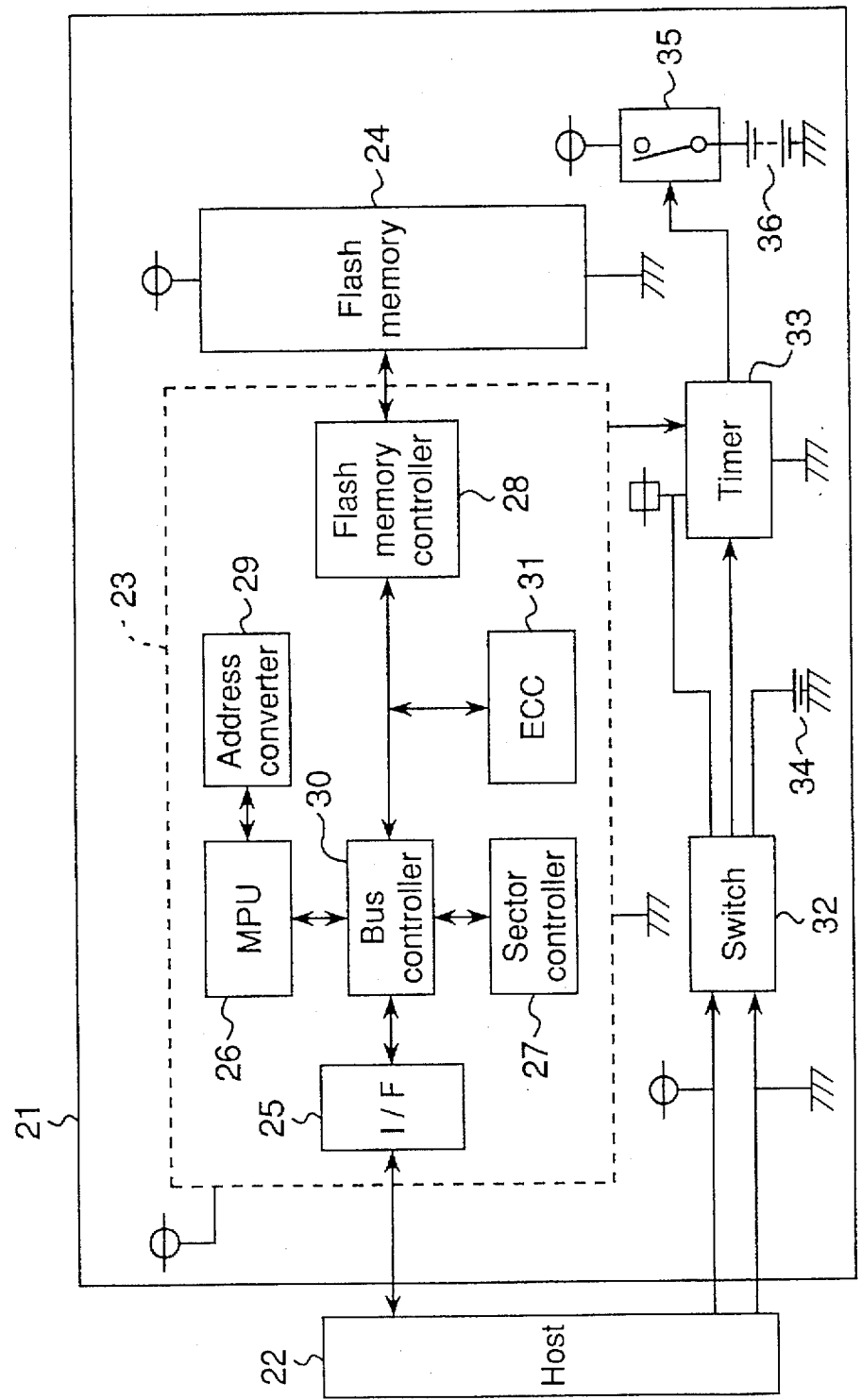
FIG. 3 is a block diagram of a flash ATA-PC card of a second embodiment of the invention.

FIG. 3 shows a flash ATA-PC card 21 of a second embodiment of the invention. The card 21 including a flash memory 24 is connected to a host 22 which supplies an electric power to the card 21. The connection of the card 21 to the host 22 is based on the ATA standards for a PC card. The card 21 is similar to the card 1 of the first embodiment except that a second power supply switch circuit 35 and a cell 36 for refreshing are included further. The card 21 has a feature that when the card 21 is inserted again, if a time longer than a predetermined time has elapsed after the card 21 is removed from the host 22, the data stored in a flash memory 24 are refreshed with an electric power supplied from the internal power supply 36.

As shown in FIG. 3, the card 21 comprises the flash memory 24 and a flash disk controller 23 controlling the flash memory 24. Similarly to the controller 3 shown in FIG. 1, the controller 23 comprises an interface 25, a microprocessor (MPU) 26, a sector buffer 27, a flash memory controller 28, and an ECC circuit 31, all connected to a bus controller 30. The interface 25 is connected to the host 22 for communicating data and commands. An address conversion circuit 29 for converting a logical address to a physical address is connected to the microprocessor 26. The flash memory controller 28 is connected to the flash memory 24 for controlling data write and data read to and from the flash memory 24. When the host requests data read of data in a logical sector through the interface 25, the microprocessor 26 reads data in a physical sector in correspondence to the logical sector determined by the address conversion circuit 29.

The card 21 further comprises a first power supply switch circuit 32, a timer 33, the second power supply switch 35 and the cell 36. The switch circuit 32 selects an electric power for the timer 33 between an external power supplied from the host 22 and an internal power supplied from the cell 36 through the second switch 35. When the card 21 is extracted or isolated electrically from the host 22, and power supply from the host 22 is stopped, the first switch circuit 32 changes the power supply for the timer 33 to the cell 36. Then, the timer 33 starts counting. A predetermined time to be counted by the timer 33 is set at a time such as a half year or a year appropriate for checking deterioration of data holding state which depends on fabrication precisian of the flash memory 24. If it is decided that the timer 33 has counted of the predetermined time or the card 21 is not used for the predetermined time before the host supplies the electric power again, the timer 33 sends a control signal to the second switch circuit 35, which supplied an electric power from the cell 36 to the card 21. Then, the microprocessor 36 make the ECC circuit 31 check if data holding characteristic is deteriorated or not. If it is decided that data holding characteristic is deteriorated, the data stored in the flash memory 24 are refreshed.

Figure 4:
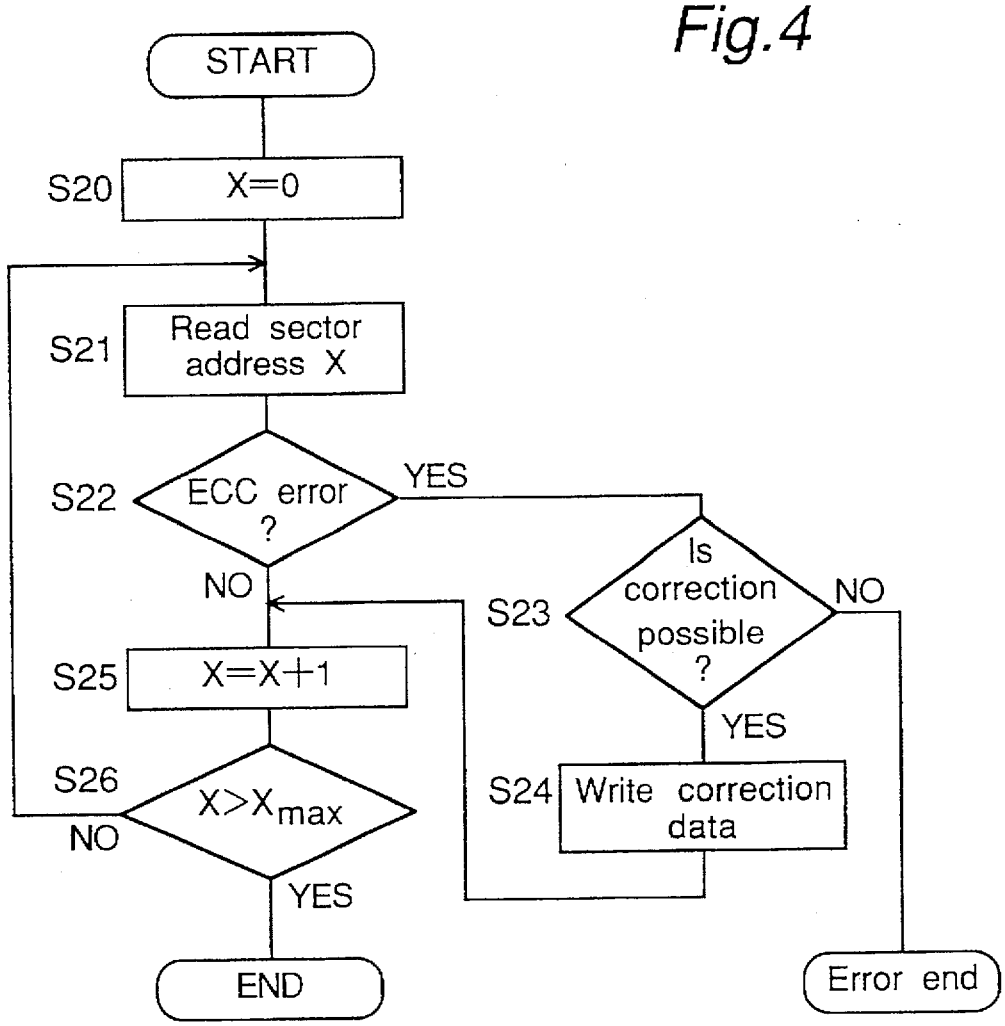
FIG. 4 is a flowchart of a microprocessor of the flash ATA-PC card of the second embodiment of the invention.

FIG. 4 shows a flowchart of the microprocessor when the electric power is supplied from the cell 36. First, a variable X is first set at zero (step S20), and a data at the sector address X is read (step S21). If a read error is detected by the ECC circuit 31 (YES at step S22) and the read error is decided to be correctable (YES at step S23), a corrected data is written to the sector of address X (step S24). On the other hand, if the read error is decided not to be correctable (NO at step S23), the flow ends. If no data read error is detected (NO at step S22), or if the read error is corrected even if it is detected (step S24), the variable X is incremented by one to check a next sector (step S25). If the variable X is less than the maximum sector number $X_{max}$ of the flash memory 24 (NO at step S26), the flow returns to step S21. If the variable X exceeds the maximum sector number $X_{max}$ (YES at step S26), all the sectors in the flash memory 24 have been checked, and the flow ends.

As explained above, the cell 36 supplies an electric power for refreshing when the timer 33 has counted the predetermined time after the card 21 is extracted from the host 22. Then, even if the card 21 is not used for a time longer than the predetermined time counted by the timer 33, data are refreshed, and the data in the card 21 can be prevented effectively from vanishing for a long time by using the internal power supply.

Figure 5:
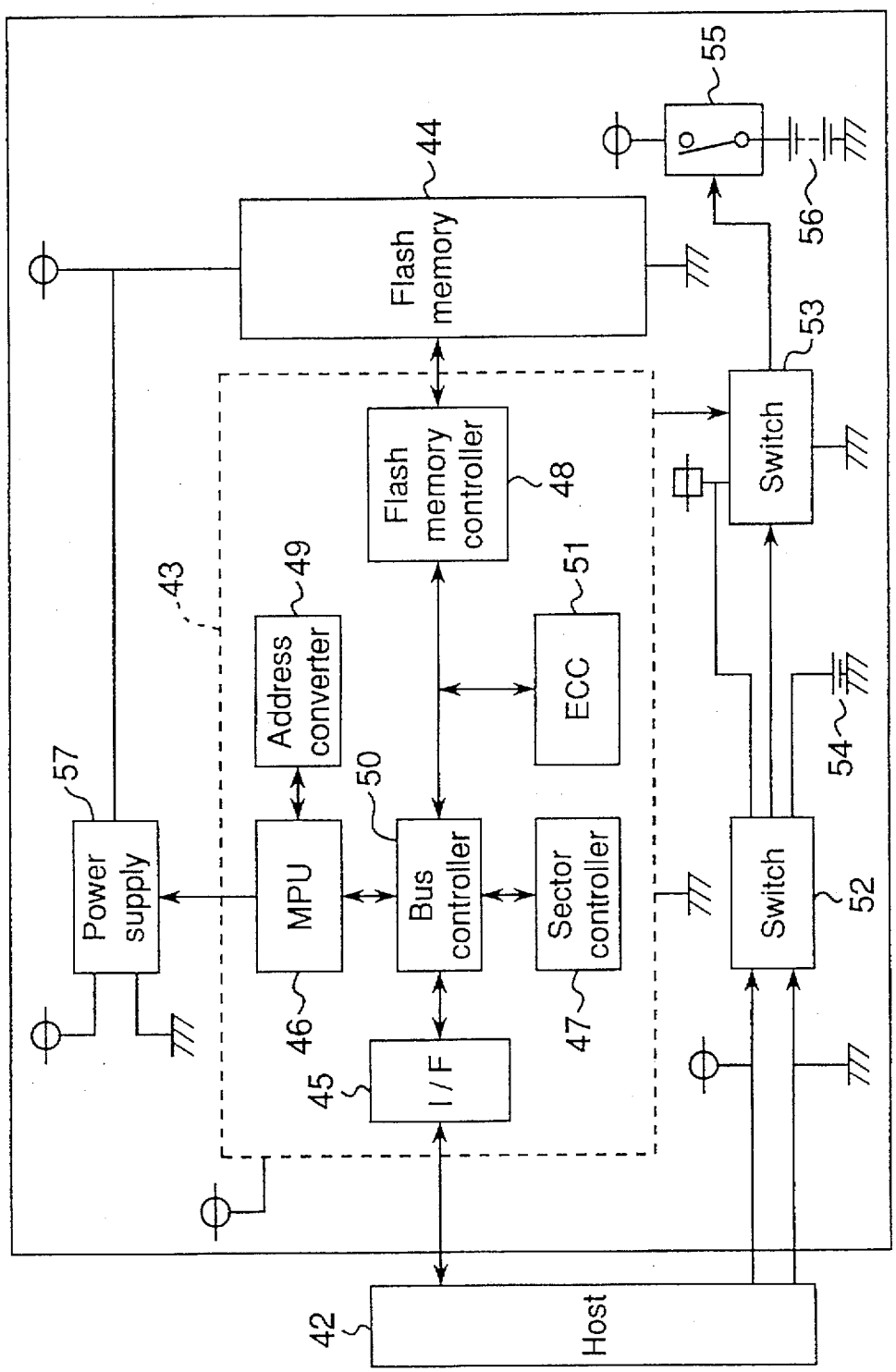
FIG. 5 is a block diagram of a flash ATA-PC card of a third embodiment of the invention.

FIG. 5 shows a flash ATA-PC card 41 of a third embodiment of the invention. The card 41 including a flash memory 44 is connected to a host 42 which supplies an electric power to the card 41. The connection of the card 41 to the host 42 is based on the ATA standards for a PC card. The card 41 is similar to the card 21 of the second embodiment except that an electric power supply 57 is provided to supply an electric voltage lower than the ordinary power supply voltage to the memory 44. The card 41 has a feature that if an uncorrectable read error on data in a sector is detected by an ECC circuit 51, the data are checked again by reading the data gain with use of an electric power from the power supply 57. Then, if the read error is found correctable, the data is corrected.

As shown in FIG. 5, the card 41 comprises the flash memory 44 and a flash disk controller 43 controlling the flash memory 44. Similarly to the controller 23 shown in FIG. 3, the controller 43 comprises an interface 45, a microprocessor (MPU) 46, a sector buffer 47, a flash memory controller 48, and the ECC circuit 51, all connected to a bus controller 50. The interface 45 is connected to the host 42 for communicating data and commands. An address conversion circuit 49 for converting a logical address to a physical address is connected to the microprocessor 46. The flash memory controller 48 is connected to the flash memory 44 for controlling data write and data read to and from the flash memory 44. When the host requests data read of data in a logical sector through the interface 45, the microprocessor 46 reads data in a physical sector in correspondence to the logical sector determined by the address conversion circuit 49.

The card 41 further comprises a first power supply switch circuit 52, a timer 53, a second power supply switch 55, a cell 56, and the power supply 57. The switch circuit 52 selects an electric power for the timer 53 between an external power supplied from the host 42 and an internal power supplied from the cell 56 through the second switch 55. When the card 41 is extracted or isolated electrically from the host 42, and power supply from the host 42 is stopped, the first switch circuit 52 changes the power supply for the timer 53 to the cell 56. Then, the timer 53 starts counting. A predetermined time to be counted by the timer 53 is set at a time such as a half year or a year appropriate for checking deterioration of data holding state which depends on fabrication precisian of the flash memory 44. If it is decided that the timer 53 has counted the predetermined time or the card 41 is not used for the predetermined time before the host 42 supplies the electric power again, the timer 53 sends a control signal to the second switch circuit 57, which supplies an electric power to the card 41. Then, the microprocessor 46 makes the ECC circuit 51 check if data holding characteristic is deteriorated or not. If it is decided that data holding characteristic is deteriorated, the data stored in the flash memory 44 are refreshed.

Even when a threshold voltage of a memory transistor is decreased due to leakage of injection electrons from a floating gate, a correct non-inverted data may be read if an electric power that is lower than the ordinary voltage is applied thereto. A voltage applied to the control gate of the memory transistor is considered to be proportional to a power supply voltage supplied to the memory transistor. Then, when an uncorrectable read error is detected by the ECC circuit 51, the microprocessor 46 sends a control signal to the power supply 57 for supplying a power supply voltage lower than the ordinary voltage to the card, and the data is read again. If the correct data is read, the correct data is overwritten, while if a correctable data is read, the data is corrected. Thus, data can be prevented more efficiently from vanishing when the card is not used for a long time by correcting data on which a read error due to deterioration of data holding characteristic.

Figure 6:
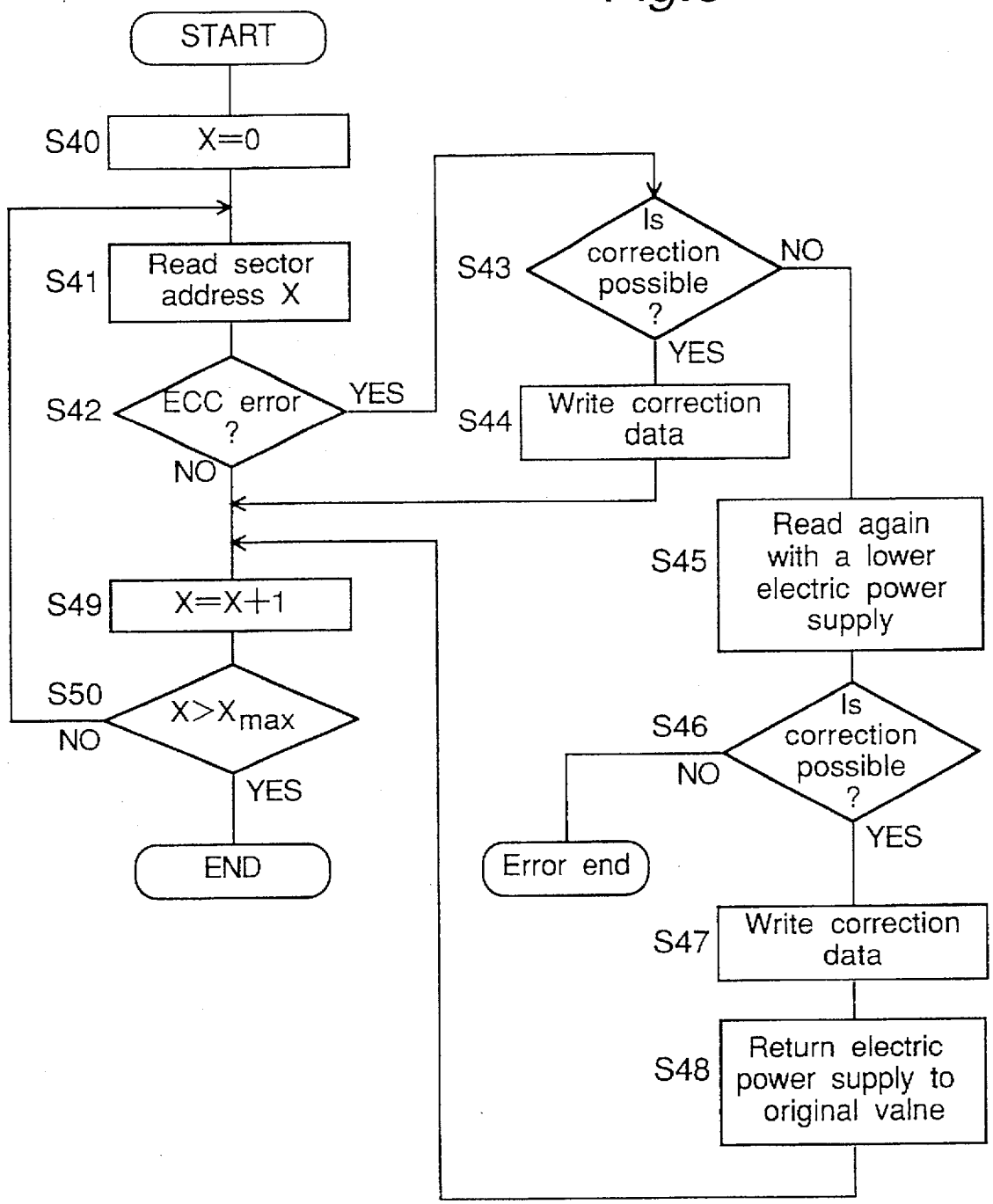
FIG. 6 is a flowchart of a microprocessor of the flash ATA-PC card of the third embodiment of the invention.

FIG. 6 shows a flowchart of the microprocessor when the electric power is supplied from the power supply 57. First, a variable X is first set at zero (step S40), and a data at the sector address X is read (step S41). If a read error is detected by the ECC circuit 51 (YES at step S42) and the read error is decided to be correctable (YES at step S43), a corrected data is written to the sector of address X (step S44). If no data read error is detected (NO at step S42), or if the read error is corrected even if it is detected (step S44), the variable X is incremented by one to check a next sector (step S45). If the variable X is less than the maximum sector number $X_{max}$ of the flash memory 44 (NO at step S46), the flow returns to step S41. If the variable X exceeds the maximum sector number $X_{max}$ (YES at step S46), all the sectors in the flash memory 44 have been checked, and the flow ends.

On the other hand, if the read error is decided not to be correctable (NO at step S43), a control signal is sent to the power supply 57 to supply a voltage lower than the ordinary value to the card, and the data is read again (step S50). If the data read again is decided not to be correctable again (NO at step S51), the flow ends. However, if the data read again is decided to be correctable again (YES at step S51), a corrected data is written to the address X (step S52). Next, another control signal is sent to the power supply 57 to supply the ordinary voltage to the card 41 (step S53), and the flow proceeds to step S45 to check the next address.

In the embodiment, the control gate voltage is applied by the power supply 57 to the flash memory 44 when data is read from the flash memory 44. However, the control gate voltage can be controlled by providing a control pin for controlling the control gate voltage in the flash memory 44. In this case, the control pin is controlled by the microprocessor 56.

In the above-mentioned embodiments, the PC card is an ATA-PC card. However, the invention is not limited to the ATA-PC card, but to be applied to any PC card comprising a flash memory device. Thus, a unit of read or write in the PC card is not limited to a sector as in an ATA-PC card.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A flash PC card comprising:
   a flash memory device;
   a timer which starts to count a predetermined time when an external power supply is stopped to be connected to the flash PC card; and
   a controller, coupled to said flash memory device and said timer, which refreshes data stored in said flash memory device if said timer has counted the predetermined time when the external power supply is started again.

2. The flash PC card according to claim 1, further comprising an error correcting code circuit, wherein said controller reads data in said flash memory device through said error correcting code circuit and writes corrected data in a portion in which said error correcting code circuit detects an correctable read error when data stored in said flash memory device are refreshed.

3. The flash PC card according to claim 2, further comprising a power control device for decreasing an electric voltage applied to control gates of transistors included in said flash memory device, wherein said controller makes said power control device decrease the electric voltage when an uncorrectable data is detected in data read from said flash memory device by said error correcting code circuit and writes corrected data in said flash memory device if said error correcting code circuit detects a correctable read error when the data on which the uncorrectable data is detected are read again.

4. A flash PC card comprising:

a flash memory device;

a timer which starts counting a predetermined time when an external power supply is stopped;

a power supply which supplies an electric power when said timer has counted said predetermined time;

a controller, coupled to said flash memory device, said timer, and said power supply, which refreshes data stored in said flash memory device when said power supply starts to supply said electric power.

5. The flash PC card according to claim 4, further comprising an error correcting code circuit, wherein said controller reads data in said flash memory device through said error correcting code circuit and writes corrected data in a portion in which said error correcting code circuit detects correctable read errors when data stored in said flash memory device are refreshed.

6. The flash PC card according to claim 5, further comprising a power control device for decreasing an electric voltage applied to control gates of transistors included in said flash memory device, wherein said controller makes said power control device decrease the electric voltage when an uncorrectable data is detected in data read from said flash memory device by said error correcting code circuit and writes corrected data in said flash memory device if said error correcting code circuit detects a correctable read error when the data on which the uncorrectable data is detected are read again.

* * * * *